(12) United States Patent
Chen et al.

(10) Patent No.: US 8,823,797 B2
(45) Date of Patent: Sep. 2, 2014

(54) SIMULATED VIDEO WITH EXTRA VIEWPOINTS AND ENHANCED RESOLUTION FOR TRAFFIC CAMERAS

(75) Inventors: Billy Chen, Bellevue, WA (US); Eyal Ofek, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 788 days.

(21) Appl. No.: 12/792,881

(22) Filed: Jun. 3, 2010

(65) Prior Publication Data

US 2011/0298928 A1   Dec. 8, 2011

(51) Int. Cl.
*H04N 7/18*  (2006.01)

(52) U.S. Cl.
CPC ............................ *H04N 7/181* (2013.01)
USPC ............ 348/149; 375/240.04; 375/240.29; 348/154; 348/155; 348/116; 348/143; 348/144; 348/145; 348/147; 348/148; 348/153

(58) Field of Classification Search
CPC ....... H04N 7/181; G08G 1/04; G08G 1/0175; G08G 1/054; G06K 9/00785; G06T 2207/10016
USPC .......... 348/149, 148, 151, 154, 155; 340/907; 246/107; 360/5
See application file for complete search history.

(56) References Cited

U.S. PATENT DOCUMENTS

| | | | |
|---|---|---|---|
| 5,270,756 A | 12/1993 | Busenberg | |
| 6,496,850 B1 * | 12/2002 | Bowman-Amuah | 709/203 |
| 7,577,522 B2 * | 8/2009 | Rosenberg | 701/433 |
| 8,170,748 B1 * | 5/2012 | Schofield et al. | 701/36 |
| 2004/0263682 A1 * | 12/2004 | Shinkai | 348/441 |
| 2005/0073136 A1 * | 4/2005 | Larsson et al. | 280/735 |
| 2005/0125121 A1 | 6/2005 | Isaji et al. | |
| 2005/0259158 A1 | 11/2005 | Jacob et al. | |
| 2006/0269105 A1 * | 11/2006 | Langlinais | 382/105 |
| 2007/0116377 A1 * | 5/2007 | Kondo et al. | 382/274 |
| 2007/0118281 A1 * | 5/2007 | Adam et al. | 701/211 |
| 2008/0002909 A1 | 1/2008 | Tsin et al. | |
| 2008/0042812 A1 | 2/2008 | Dunsmoir et al. | |
| 2008/0094250 A1 | 4/2008 | Myr | |
| 2009/0219387 A1 | 9/2009 | Marman et al. | |
| 2009/0228157 A1 * | 9/2009 | Breed | 701/1 |
| 2009/0237510 A1 | 9/2009 | Chen et al. | |

FOREIGN PATENT DOCUMENTS

| | | | | |
|---|---|---|---|---|
| EP | 1626582 A2 | 2/2006 | | |
| EP | 1121245 B1 * | 12/2008 | | G05B 23/02 |
| JP | 11039589 A | 2/1999 | | |
| JP | 11096494 A | 4/1999 | | |
| JP | 2002329195 A * | 11/2002 | | G06T 1/00 |

OTHER PUBLICATIONS

Li et al, Video-based Vehicle Detection Scheme in Complex Traffic Scene at Urban Intersection, 2009.*

(Continued)

*Primary Examiner* — Andy Rao
*Assistant Examiner* — Shan Elahi
(74) *Attorney, Agent, or Firm* — Steven Spellman; Jim Ross; Micky Minhas

(57) ABSTRACT

Simulated high resolution, multi-view video based on video input from low resolution, single-direction cameras is provided. Video received from traffic cameras, security cameras, monitoring cameras, and comparable ones is fused with patches from a database of pre-captured images and/or temporally shifted video to create higher quality video, as well as multiple viewpoints for the same camera.

19 Claims, 7 Drawing Sheets

(56) References Cited

OTHER PUBLICATIONS

Sompoch et al, Three line scanner, modern airborne sensor and algorithm of vehicle detection along mega City Street, 2001.*

Haidarian-Shahri, et al., "A Graph-based Approach to Vehicle Tracking in Traffic Camera Video Streams", Retrieved at << http://linqs.cs.umd.edu/basilic/web/Publications/2007/shahri:dmsn07/dmsn07.pdf >>, ACM International Conference Proceedings Series, vol. 273, Proceedings of the 4th workshop on Data management for sensor networks in conjunction with 33rd International Conference on Very Large Data Bases, Sep. 24, 2007, pp. 6.*

"International Search Report", Application No. PCT/US2011/037488, Filed Date: May 23, 2011, pp. 3.

* cited by examiner

SIMULATED VIDEO WITH EXTRA VIEWPOINTS AND ENHANCED RESOLUTION FOR TRAFFIC CAMERAS

BACKGROUND

With increased deployment and use of data networks, video feeds for various purposes are a common aspect of daily experiences for many people. One of the applications of video feeds includes traffic cameras. In many cities and other locales, video from traffic cameras is available for individuals to view over the Internet or other networking means. Commuters can watch traffic conditions by checking traffic cameras before leaving home or work and plan their routes accordingly. As vehicle mount computer systems become more common, even drivers (when the conditions are safe) can check traffic ahead through cameras and alter their routes if necessary.

Typical traffic cameras are positioned along a road pointing in one direction. Additionally, most traffic cameras are low resolution cameras that cannot show details of the background or cars farther away from the camera for practical reasons. Thus, the information a viewer can get from watching video feeds of a traffic camera is limited. For example, cars farther away are blurry, they can only see cars coming toward the camera or going away from the camera, but not both for the same lane of traffic, etc.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to providing simulated high-frame rate, high resolution, multi-view video images of traffic using video input from low-frame rate, low resolution, single-direction traffic cameras. According to some embodiments, received video may be fused with patches from a database of pre-captured images and/or temporally shifted video to create higher quality video, as well as multiple viewpoints for the same camera. According to other embodiments, the enhancement of video resolution and creation of multiple viewpoints may be applied to other types of cameras such as security cameras, monitoring cameras, and comparable ones.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
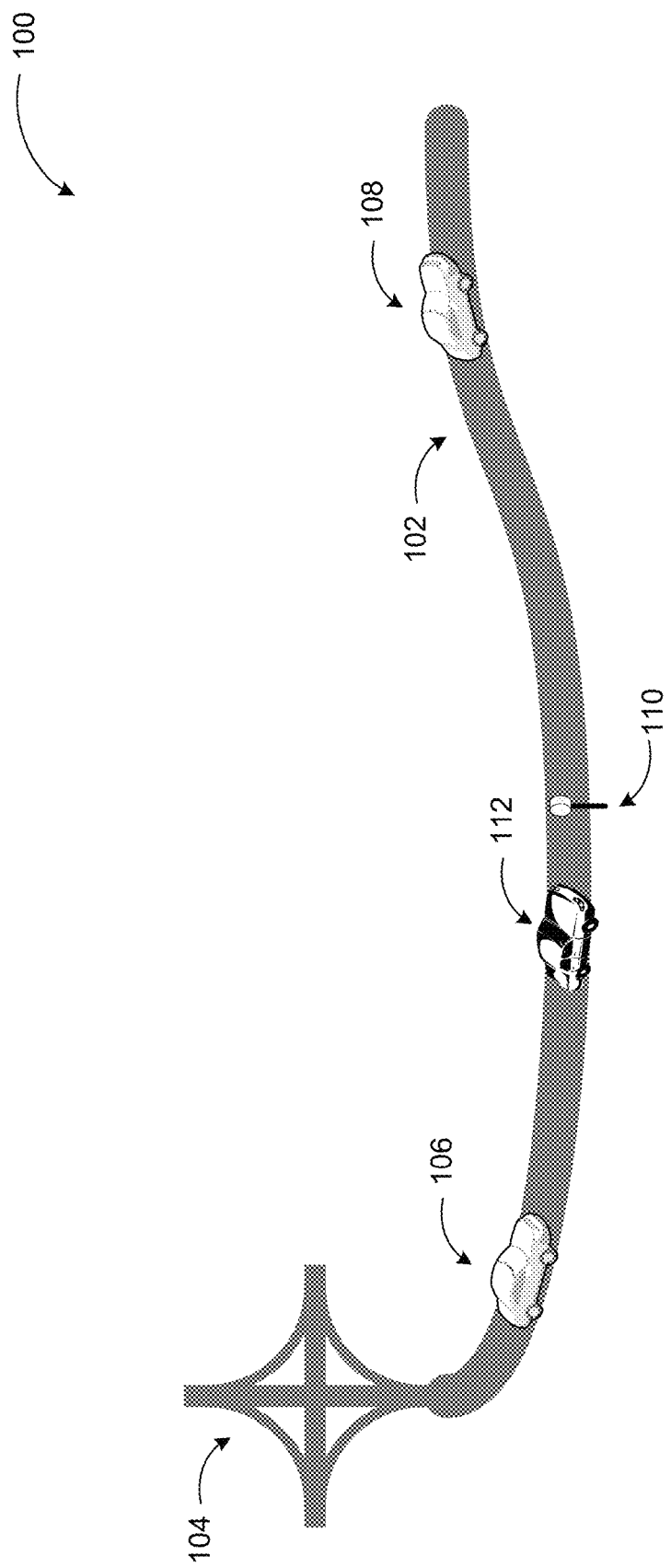
FIG. 1 is a conceptual diagram illustrating a road with a traffic camera, where enhancement of video resolution and creation of multiple viewpoints according to embodiments may be employed.

As briefly described above, simulated high resolution, multi-view video images of traffic may be created based on video feeds from low resolution, single-direction traffic cameras. Received video may be fused with patches from a database of pre-captured images and/or temporally shifted video to create higher quality video, as well as multiple viewpoints for the same camera. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for managing video capture, processing, and transmission operations. Examples of platforms include, but are not limited to, a hosted service executed over a plurality of servers, an application executed on a single server, and comparable systems. The term "server" generally refers to a computing device executing one or more software programs typically in a networked environment. However, a server may also be implemented as a virtual server (software programs) executed on one or more computing devices viewed as a server on the network.

The terms "low resolution" and "high or enhanced resolution" are used to distinguish captured video quality of conventional camera systems and simulated videos generated according to embodiments herein. As a concrete example, video resolutions may range between about 480*640 pixels and 4800*6400 pixels, and conventional traffic cameras may be capable of resolutions toward the low end of the spectrum, while a simulated video according to embodiments may enhance the resolution toward the higher end of the spectrum. However, other resolutions may be used without departing from a spirit and scope of the disclosed subject matter.

FIG. 1 includes conceptual diagram 100 illustrating a road with a traffic camera, where enhancement of video resolution and creation of multiple viewpoints according to embodiments may be employed. As shown in diagram 100, a traffic camera 110 at a fixed position on road 102 is a single-direction camera capturing the video of cars 106 and 112 approaching the camera. Car 108 driving away from the camera is no longer in the camera's viewpoint. Indeed, any cars past the camera may not be seen at all. Furthermore, common traffic cameras are typically low resolution cameras (typically to reduce the amount of video data to be transported over the network connecting the camera to the video processing system). Therefore, details of car 112 may be captured as it is near the camera, but car 106 is likely to be seen blurry in the captured video.

Certain locations may be set up with multiple cameras such as intersection 104. However, a number and coverage of cameras on straight sections of the road are typically limited. Even at intersections with multiple cameras, the cameras do not cover all angles and are still subject to degradation of image quality with distance due to camera resolutions.

A system according to embodiments is configured to synthetically create high resolution views of cars in a traffic feed and/or to view these cars from different viewpoints. The former may be accomplished by building image analogies with pixels at different times of the camera feed and the latter may be achieved by a pre-capture database of imagery. For the database, imagery containing front, back, and/or other views of cars may be collected. The images may be obtained by tracking cars across multiple traffic cameras, receiving images from manufacturer databases, and comparable methods. The input camera feed is not a single image, but a series of images, captured at high-enough frequency to observe the same car at multiple instances along the road (e.g. at predefined distance ranges like distant, medium, and near). Moreover, the viewing experience need not be in real time. The viewer may be observing video that is buffered or delayed (e.g. by a few seconds). The delay may be used to process the video for visualization (e.g. borrow pixels from the "future" frames).

To display the input from a traffic camera from a different point of view, the images of various cars from different angles may be used to create simulated images of cars for different viewpoints. The data may be displayed by superimposition on an orthographic map, or from human scale bubbles, looking at the road from different points of view. When projecting the traffic video on a geometry the degradation in the video quality of the cars can be seen (represented in diagram 100 with the blurry image of car 106) as the viewer looks farther away from the camera. However, every car that is displayed far from the camera was shown at higher details when it was closer to the camera (for cars that are driving away from the camera) or in a few seconds, when it will get closer to the camera (for cars approaching the camera).

Figure 2:
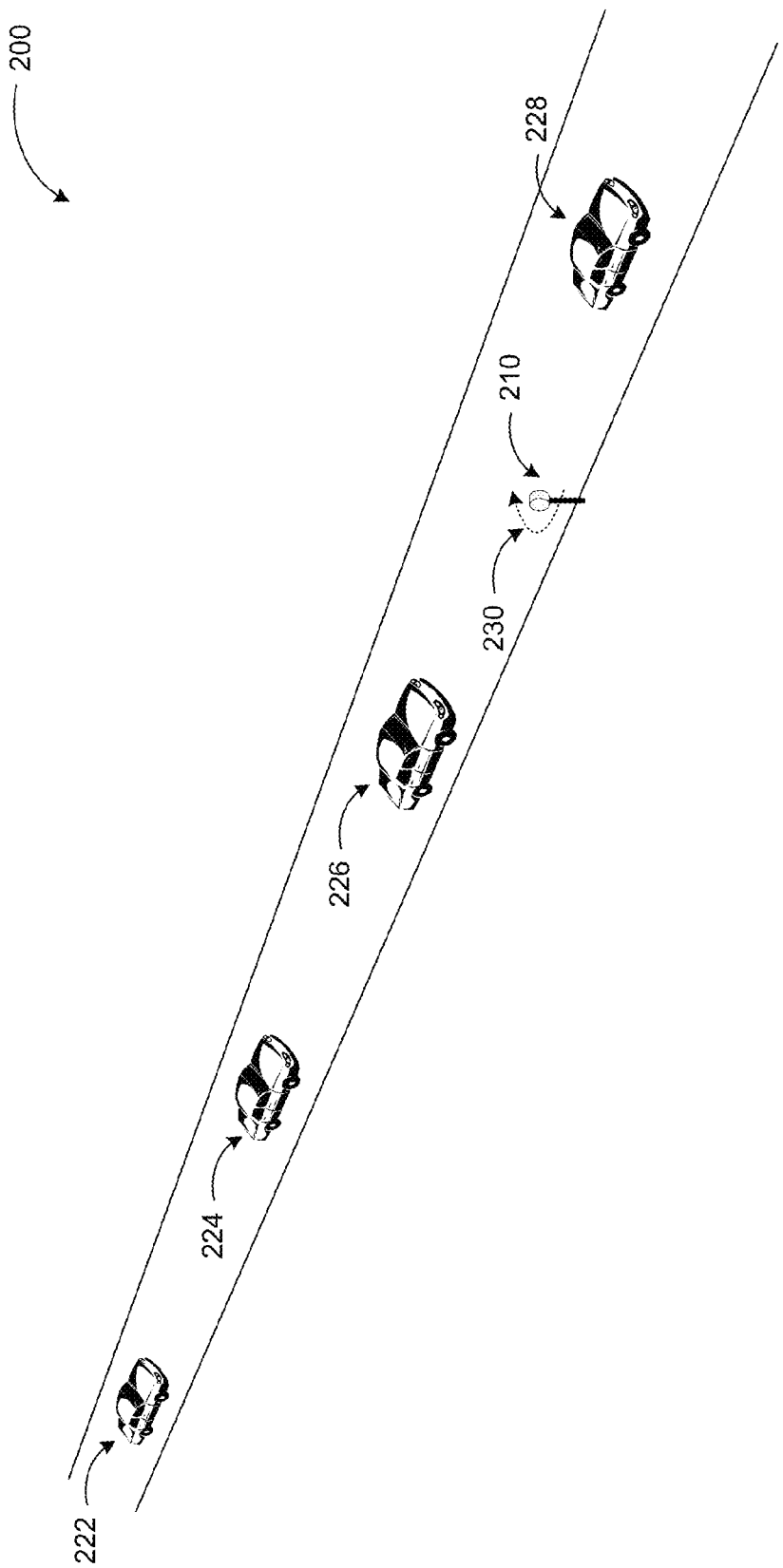
FIG. 2 illustrates another road with enhanced resolution and multiple viewpoints for a traffic camera according to embodiments.

FIG. 2 illustrates another road with enhanced resolution and multiple viewpoints for a traffic camera according to embodiments. To render the blurry (distant) cars at a resolution higher than the captured resolution, the higher resolution image of the same cars captured as they were closer or will be captured as they approach the camera may be used according to some embodiments. In other words, pixels may be "borrowed" from the nearby car image and transferred to the distant car image either back in time or in the future. For the look "into the future", the video may be delayed by a predefined period of time in order to borrow pixels of the nearby car to simulate the higher resolution of the distant one.

In diagram 200, the enhanced resolution of the cars in the distance is represented by the clear images of the approaching cars 222, 224, and 226. Car 226 is already near camera 210 and may not need its image enhanced. Car 224 is at a medium distance away from the camera and may need its image slightly enhanced by using pixels from time shifted (future) frames. Car 222 is at a far distance. Its image may need to be enhanced more than that of car 224. The pixels may be selected from one or more frames of the car(s) when they are near the camera, then fused with the actual image to create a higher resolution image of the distant car.

As discussed above, another limitation with conventional traffic cameras is that they are fixed to one location and one direction. This makes it impossible to view the traffic from another direction or another viewpoint through a single camera. A system according to other embodiments, takes advantage of the symmetry of the traffic to simulate a view of the traffic in the opposite direction. In other words, traffic viewed at one point necessarily travels in the opposite direction at an opposing viewpoint. The challenge with rendering such a view includes the hidden parts of the cars, which are visible at the opposing viewpoint (e.g. the back of car 228).

To render simulated images of cars in directions other than the camera's direction models of cars may be used to render them instead of the video. While this approach may have advantages, such as rendering of the cars outside the visible frustum and multidirectional viewing, the rendered video is bound to look artificial. To generate a photorealistic image-based rendering of the simulated traffic video, other angles of the cars may be used based on real images from a collected image database. For example, a type and color of an oncoming car may be determined and other views of the same car (e.g. the back) retrieved from a collected imagery database. The retrieved image(s) may then be used to fuse together a simulated video stream in the opposite direction using a speed of the oncoming car as reference.

In diagram 200, generation of simulated video in directions other than the camera's direction is represented by the virtual rotation 230 of traffic camera 210. Indeed, views of cars from various angles (e.g. front, side, back) may be used to generate multiple simulated videos and users may be enabled to "virtually" rotate the camera viewing the traffic flow at different angles. Camera 210 may be any video capturing device connected to a processing system through wired or wireless (e.g. radio frequency "RF", optic, or similar) communication means.

Figure 3:
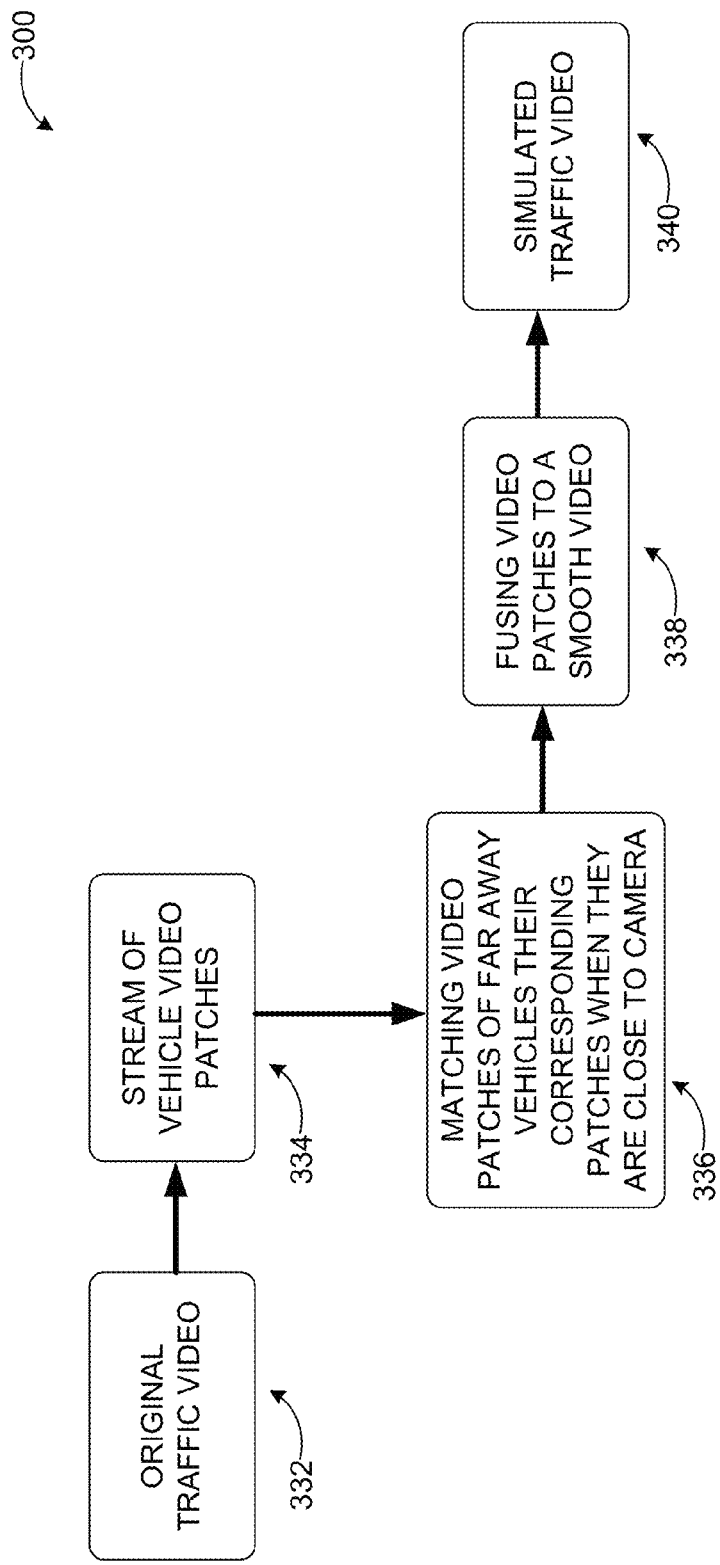
FIG. 3 illustrates a block diagram of a system for creating simulated traffic video with multiple viewpoints.

FIG. 3 illustrates block diagram 300 of a system for creating simulated traffic video with enhanced resolution. As discussed above, one aspect of generating a simulated video from a traffic camera video feed involves enhancing resolution of the video such that cars at various distances can be viewed with similar quality. In a system according to embodiments, the original traffic video 332 may be used to generate a stream of vehicle video patches 334. Assuming cars at time t will be distant in the image in the frames buffer, cars at frame t+n may be matched to the cars at time t. A moving window with normalized cross-correlation or similar approach may be employed to perform the matching at block 336.

The patches may then be fused together (338) to generate a smooth traffic video 340, in which distant blurry cars at time t are replaced with patches of nearby cars from time t+n. The video may then be rendered through a rendering application at a client machine or through a web service.

According to other embodiments, a noise associated with distant cars may be reduced, their contrast enhanced and/or sharpened. For example, in a foggy day distant cars may appear both blurry and dull. Both the blurriness and dullness occur due to atmospheric light scattering into the view direction and car colors scattering out into the fog. By using a near image of the cars, the view of these distant cars may be enhanced by reducing the blurriness and dullness. Moreover, the generated video need not be of the same temporal resolution (e.g. frame rate) as the input video. "In-between" frames may also be created using a similar matching process.

Figure 4:
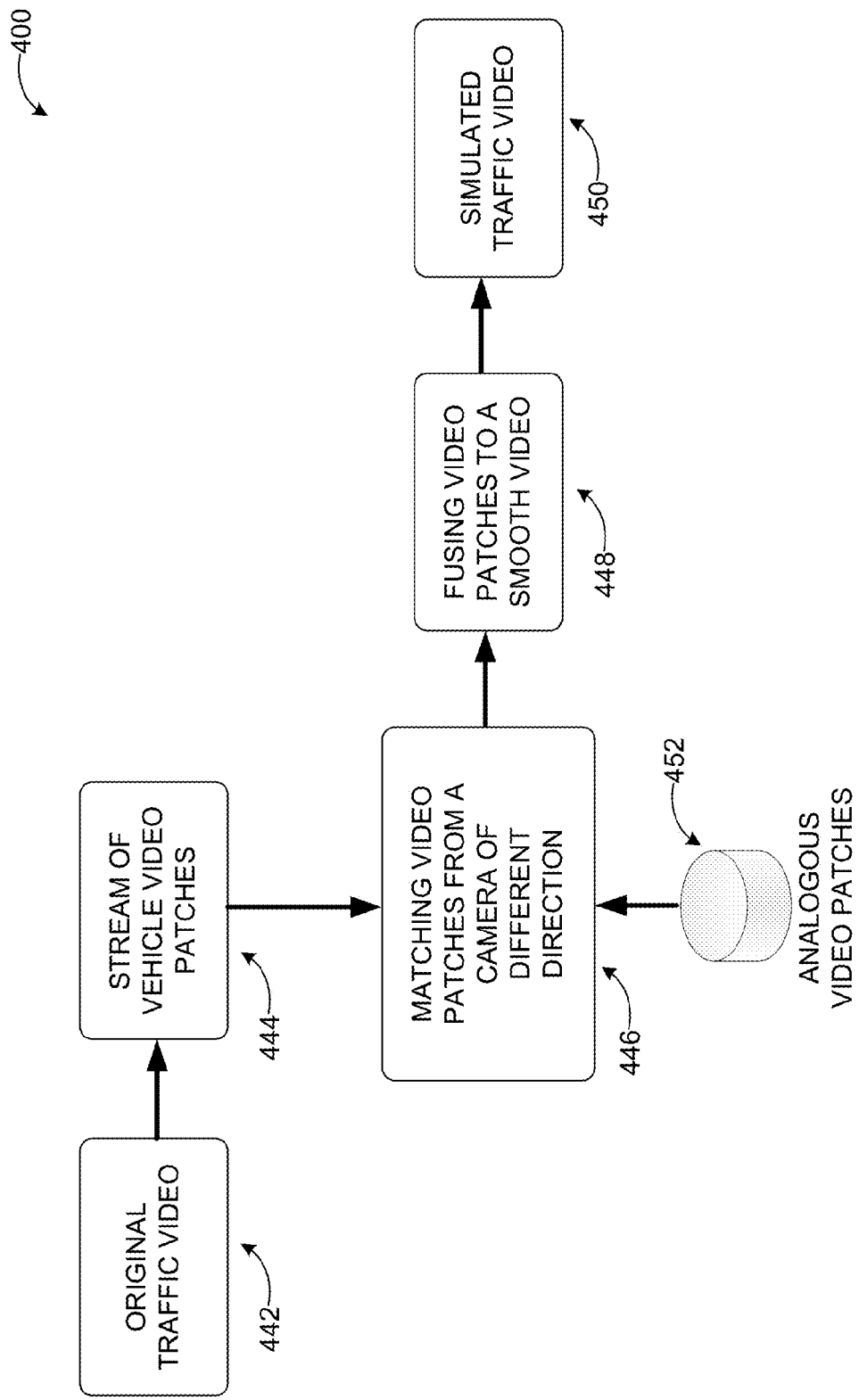
FIG. 4 illustrates a block diagram of a system for creating simulated traffic video with multiple viewpoints.

FIG. 4 illustrates block diagram of a system for creating simulated traffic video with multiple viewpoints. Another aspect of generating a simulated video from a traffic camera video feed involves generating multiple viewpoints from the single-direction camera. The system for generating multiple viewpoints begins, similarly to that system described in FIG. 3, with the original traffic video 442, from which a stream of vehicle video patches 444 is generated. In the original traffic video 442, only the fronts (approaching traffic) or the backs (vehicles moving away from the camera) of the vehicles may be visible. The missing images for the captured vehicles (e.g. back, side, etc. of a car whose front is visible) may be retrieved from a database of analogous video patches 452 at matching process 446.

Database of analogous video patches 452 may contain pre-captured and/or synthetically generated images of vehicles of various makes, models, colors, etc. The stored images may be obtained from traffic camera captured videos, manufacturer data sources, dealer data sources, and any other source of image data for vehicles. For example, multiple cameras pointing in different directions may be set up at a location for a predetermined period of time to capture images of cars at various angles and those images indexed and stored such that they can be used later in conjunction with other cameras.

Matching process 446 may first match the captured view of a car (e.g. front) to an image in the database, then find the corresponding back view image (and others). At fusing process 448, patches of the selected images may be fused into a video using additional information such as road and/or background images, paths of the cars, speed of the cars, and even audio (varying background sound according to Doppler shift may provide an even more realistic experience to users). The audio may be recorded and/or generated audio. The simulated video 450 resulting from the fusing process may be rendered as discussed above.

The different processes discussed in FIGS. 3 and 4 such as generating the stream of video patches, matching the video patches, and fusing may be performed at distinct hardware modules, software modules, or combinations of hardware and software. Furthermore, such modules may perform two or more of the processes in an integrated manner.

The example systems in FIGS. 3 and 4 have been described with components, processes, and methods of generating simulated video. Embodiments are not limited to systems according to these example configurations. A platform providing simulated traffic video with multiple viewpoints and enhanced resolution may be implemented in configurations employing fewer or additional components and performing other tasks. Furthermore, embodiments are not limited to traffic cameras alone. Generation of a simulated video may be implemented in different types of monitoring camera systems, security systems, and comparable ones using the principles described herein. Moreover, video aspects of the embodiments may be combined with other effects such as audio, color, etc. to enhance user experience.

Figure 5:
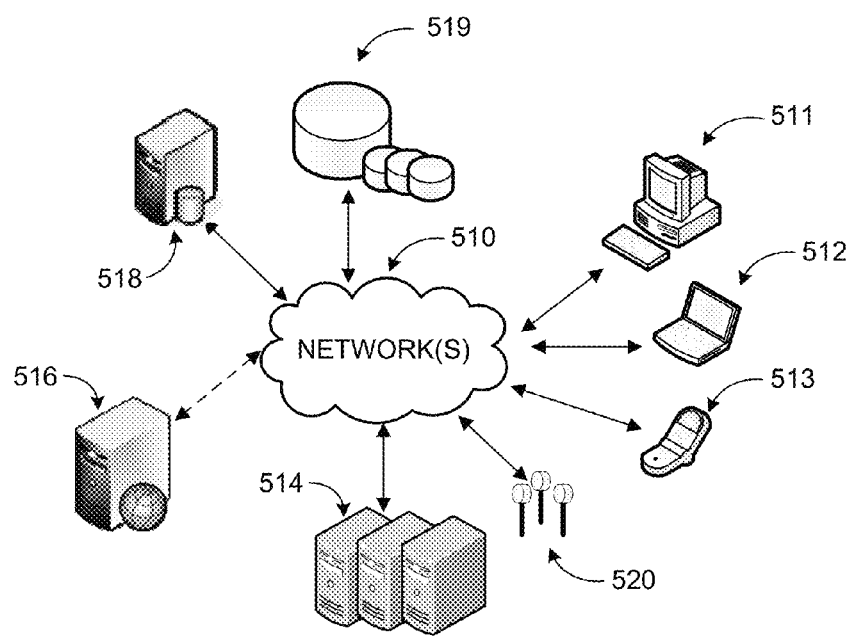
FIG. 5 is a networked environment, where a system according to embodiments may be implemented.

FIG. 5 is an example networked environment, where embodiments may be implemented. A platform for creating simulated video with enhanced resolution and multiple viewpoints may be implemented via software executed over one or more servers 514 such as a hosted service. The platform may communicate with client applications on individual computing devices such as a smart phone 513, a laptop computer 512, or desktop computer 511 ('client devices') through network(s) 510.

Client applications executed on any of the client devices 511-513 may interact with a web application through a browsing application on the servers 514, or on individual server 516. The web application may receive low resolution video from single-direction cameras 520 and create a high resolution, multiple viewpoint video as described previously. Alternatively, the generation of the simulated video may be performed by an image processing application separate from the web application, and the web application may render the simulated video for users on their client devices. Relevant data such as pre-captured images of vehicles or time-shifted video may be stored and/or retrieved at/from data store(s) 519 directly or through database server 518.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to implement a platform providing a simulated high resolution, multi-view video based on low resolution single-direction camera input. Furthermore, the networked environments discussed in FIG. 5 are for illustration purposes only. Embodiments are not limited to the example applications, modules, or processes.

Figure 6:
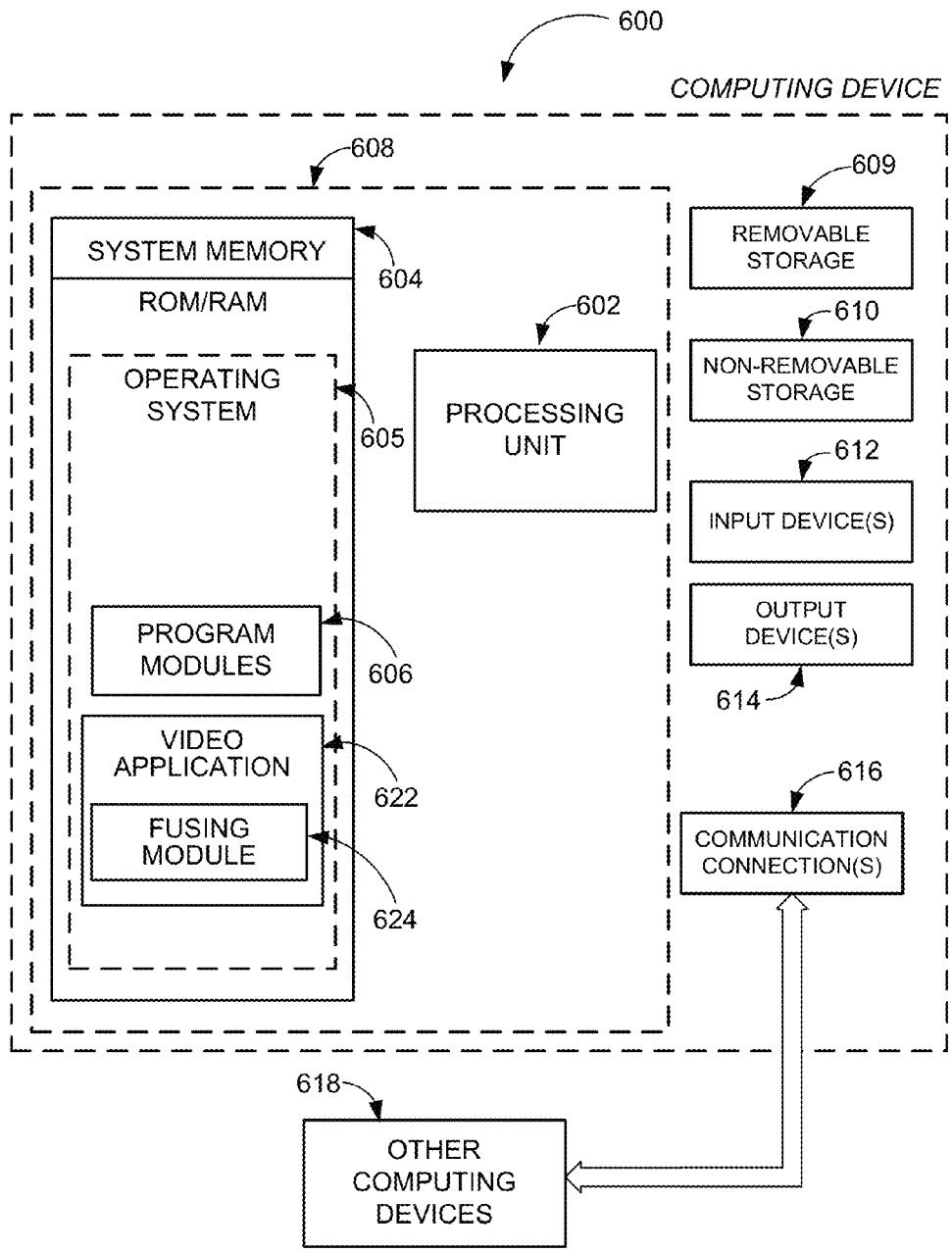
FIG. 6 is a block diagram of an example computing operating environment, where embodiments may be implemented.

FIG. 6 and the associated discussion are intended to provide a brief, general description of a suitable computing environment in which embodiments may be implemented. With reference to FIG. 6, a block diagram of an example computing operating environment for an application according to embodiments is illustrated, such as computing device 600. In a basic configuration, computing device 600 may be a server executing a video processing application capable of generating a simulated high resolution, multiple viewpoint video according to embodiments and include at least one processing unit 602 and system memory 604. Computing device 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 605 suitable for controlling the operation of the platform, such as the WINDOWS® operating systems from MICROSOFT CORPORATION of Redmond, Wash. The system memory 604 may also include one or more software applications such as program modules 606, video application 622, and fusing module 624.

Video application 622 may receive video feed from low resolution, single-direction cameras and create a high resolution, multiple viewpoint video as discussed previously. Fusing module 624 may fuse the original video with patches of pre-captured vehicle images and/or time shifted video streams to generate multiple viewpoints and enhance the resolution of the simulated video. Video application 622 and fusing module 624 may be separate applications or an integral component of a hosted service. This basic configuration is illustrated in FIG. 6 by those components within dashed line 608.

Computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer readable storage media may include volatile and nonvolatile, removable and non-removable media implemented in any method or technology for storage of information, such as computer readable instructions, data structures, program modules, or other data. System memory 604, removable storage 609 and non-removable storage 610 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 600. Any such computer readable storage media may be part of computing device 600. Computing device 600 may also have input device(s) 612 such as keyboard, mouse, pen, voice input device, touch input device, and comparable input devices. Output device(s) 614 such as a display, speakers, printer, and other types of output devices may also be included. These devices are well known in the art and need not be discussed at length here.

Computing device 600 may also contain communication connections 616 that allow the device to communicate with other devices 618, such as over a wired or wireless network in a distributed computing environment, a satellite link, a cellular link, a short range network, and comparable mechanisms. Other devices 618 may include computer device(s) that execute communication applications, other servers, and comparable devices. Communication connection(s) 616 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 7:
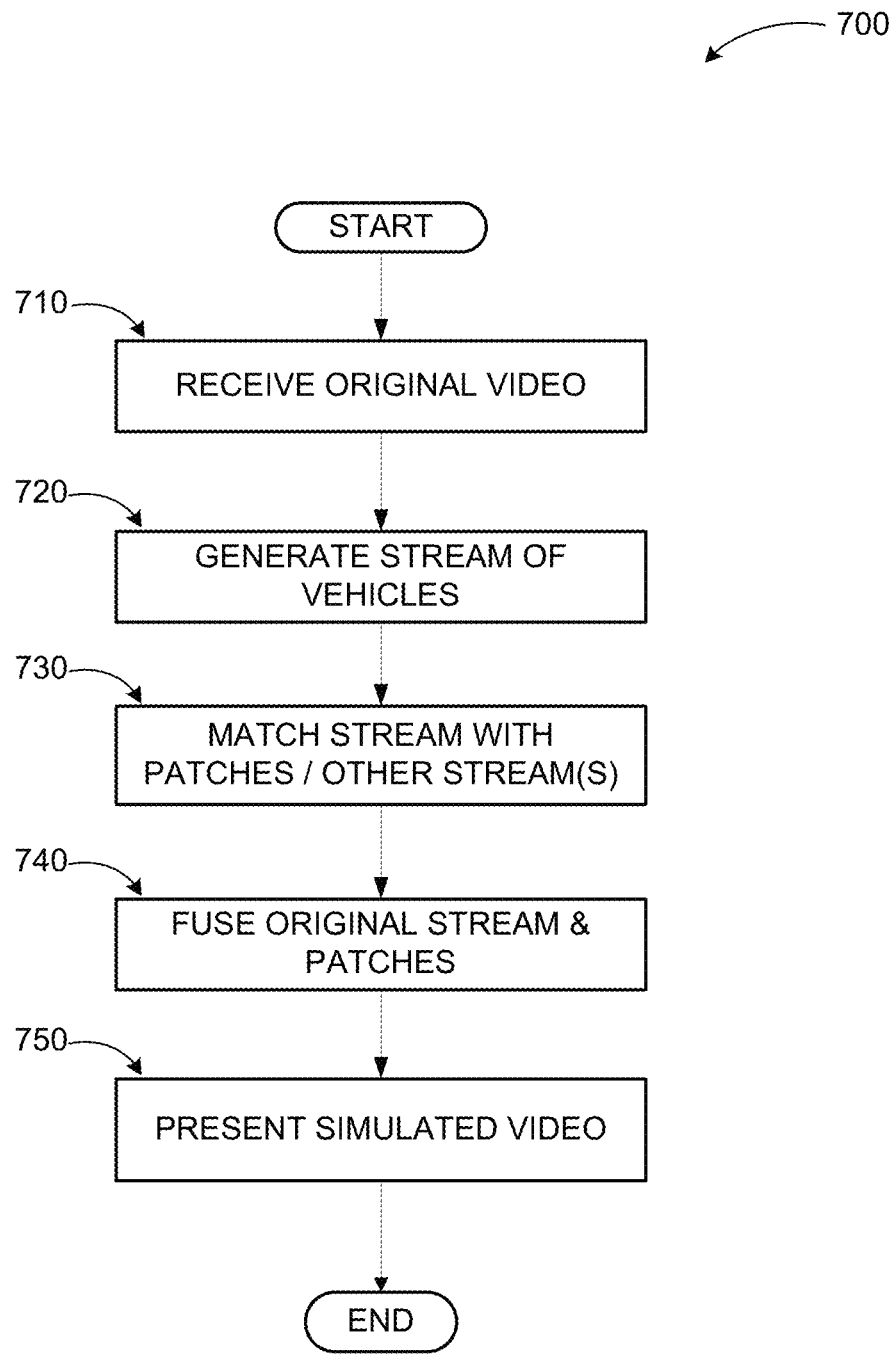
FIG. 7 illustrates a logic flow diagram for a process of providing enhanced resolution and multi-viewpoint video based on input from low resolution, single-direction traffic cameras according to embodiments.

FIG. 7 illustrates a logic flow diagram for process 700 of providing enhanced resolution and multi-viewpoint video based on input from low resolution, single-direction traffic cameras according to embodiments. Process 700 may be implemented as part of a web application executed on a server.

Process 700 begins with operation 710, where the original video from a low resolution, single-direction video camera is received. The received video may be pre-processed. For example, a format of the received video may be modified, the video filtered, etc. At operation 720, a stream of video patches is generated such that matching and fusing can be performed subsequently. The patches may be successive video frames corresponding to movement of vehicles at predefined distances (e.g. distant, medium, near).

At operation 730, the stream of patches is matched with patches from a camera of different direction and/or patches of time shifted frames (e.g. when the vehicles are closer to the camera). The first matching enables generation of additional viewpoints (e.g. the opposite direction of the original camera's viewpoint showing the vehicles driving away) while the latter matching enhances the resolution of the video stream. Patches from the different direction may include pre-captured images of vehicles of different types from different angles (rear view of a red passenger car, side view of a green truck, specific brands of cars, etc.).

At operation 740, the original stream and the matched patches may be fused together resulting in the simulated video, which may be presented to a user at operation 750 (e.g. rendered through the user's browsing application). Before fusing, a size of images may also be adjusted.

The operations included in process 700 are for illustration purposes. Generating an enhanced resolution, multi-viewpoint simulated video may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for generating an enhanced simulated video from a camera feed, the method comprising:

setting up a plurality of cameras in different directions at a location for a predetermined period of time to capture stored images of vehicles at a plurality of angles that are indexed;

receiving an original video input from a single-direction camera;

generating a stream of vehicle video patches;

matching vehicles in the vehicle video patches to corresponding the stored images of vehicles employing a moving window with normalized cross-correlation, wherein the stored images of the vehicles are based on at least one from a set of: a make, a model, and a color of each vehicle;

retrieving images of a different angle corresponding to the stored images of the vehicles;

fusing the retrieved images into a simulated video displaying the vehicles moving in another direction;

generating the simulated video at a different frame rate than a frame rate of the original video input to reduce a blurriness and a dullness of the original video input; and rendering the simulated video.

2. The method of claim 1, wherein the retrieved images are back images of the vehicles and the simulated video represents traffic flow in opposite direction of camera direction.

3. The method of claim 1, the stored images of the vehicles are obtained from at least one from a set of: images previously captured by the camera, images received from vehicle manufacturer, and images received from vehicle dealers.

4. The method of claim 1, further comprising:
enhancing the simulated video employing at least one from a set of: a road image, a background image, a path of each vehicle, a speed of each vehicle, a recorded audio, and a generated audio.

5. The method of claim 1, further comprising:
buffering a predefined number of frames;
capturing images of vehicles in frames where the vehicles appear near the camera;
adjusting a size of the captured images;
superimposing the adjusted images over frames where the same vehicles appear away from the camera; and
fusing the more than one superimposed frames into the simulated video.

6. The method of claim 5, wherein the buffering is performed for future frames.

7. The method of claim 5, wherein the vehicles in buffered frames are matched employing normalized cross-correlation.

8. The method of claim 5, wherein a number of the frames to be buffered is determined based on predefined distance ranges of vehicles from the camera.

9. The method of claim 8, wherein the predefined distance ranges include distant, medium, and near.

10. A system for generating an enhanced simulated video from a camera feed, the system comprising:
at least one single-directional camera;
a server coupled to the at least one single-directional camera, the server executing a video processing application, wherein the video processing application is configured to:
set up a plurality of cameras in different directions at a location for a predetermined period of time to capture stored images of a vehicle at a plurality of angles that are indexed;
receive an original video input from the single-direction camera;
generate a stream of vehicle video patches;
buffer a predefined number of video frames;
capture images of a first group of vehicles in frames where the vehicles appear near the camera, wherein the images of the vehicles correspond to at least one of: a make, a model, and a color of each vehicle;
superimpose the images over frames where the first group of vehicles appear away from the camera;
match a second group of vehicles in the vehicle video patches to corresponding the stored images of vehicles employing a moving window with normalized cross-correlation;
retrieve images of a different angle corresponding to the stored images of the vehicles;
fuse the superimposed images into a first simulated video with enhanced resolution;
fuse the retrieved images into a simulated second video displaying the second group of vehicles moving in another direction; and
render the simulated videos.

11. The system of claim 10, wherein the first and second videos are the same video stream.

12. The system of claim 10, wherein the video processing application is further configured to enable a user to select a viewing angle by selecting the images of the different angle based on user input providing the user a virtual rotation of the camera.

13. The system of claim 10, wherein the stored images include at least one of: pre-captured images and synthetically generated images.

14. The system of claim 10, wherein the second video is generated by fusing the retrieved images over an orthographic map.

15. The system of claim 10, wherein the camera is one of a traffic camera, a monitoring camera, and a security camera.

16. The system of claim 10, further comprising a data store for storing at least one from a set of: images of vehicles, buffered video frames, and fused videos.

17. A computer-readable memory device with instructions stored thereon for generating an enhanced simulated video from a camera feed, the instructions comprising:
receiving an original video input from a single-direction camera;
generating a stream of vehicle video patches;
buffering a predefined number of frames;
matching the buffered frames employing a moving window with normalized cross-correlation such that images of vehicles farther away from the camera are enhanced, wherein more than one stored image of the vehicles are based on at least one of: a make, a model, and a color of each vehicle;
fusing the matched frames into the simulated video; and
generating the simulated video at a different frame rate than a frame rate of the original video input to reduce a blurriness and a dullness of the original video input.

18. The computer-readable memory device of claim 17, wherein the instructions further comprise:
matching vehicles in the vehicle video patches to corresponding stored images of the vehicles;
retrieving images of a different angle corresponding to the stored images of the vehicles; and
fusing the retrieved images into the simulated video displaying the vehicles moving in another direction.

19. The computer-readable memory device of claim 17, wherein generating the stream of video patches, buffering the frames, and matching the frames are each performed by at least one from a set of: a hardware module, a software module, and a combination of a hardware and software module.

* * * * *